(12) United States Patent
Hong et al.

(10) Patent No.: US 8,804,256 B2
(45) Date of Patent: Aug. 12, 2014

(54) HARD DISK DRIVE, METHOD FOR OPERATING THE SAME, AND COMPUTER SYSTEM HAVING THE SAME

(75) Inventors: Jae-Ki Hong, Suwon-si (KR); Jin Wan Jun, Seoul (KR)

(73) Assignee: Seagate Technology LLC, Cupertino, CA (US)

( * ) Notice: Subject to any disclaimer, the term of this patent is extended or adjusted under 35 U.S.C. 154(b) by 112 days.

(21) Appl. No.: 13/538,721

(22) Filed: Jun. 29, 2012

(65) Prior Publication Data

US 2013/0003210 A1    Jan. 3, 2013

(30) Foreign Application Priority Data

Jun. 30, 2011    (KR) .................. 10-2011-0065100

(51) Int. Cl.
G11B 27/36    (2006.01)

(52) U.S. Cl.
USPC ............... 360/31; 360/53; 360/55; 360/75

(58) Field of Classification Search
None
See application file for complete search history.

(56) References Cited

U.S. PATENT DOCUMENTS

2010/0073795 A1*    3/2010    Amano ..................... 360/31

* cited by examiner

Primary Examiner — Muhammad N Edun
(74) Attorney, Agent, or Firm — Hollingsworth Davis, LLC

(57) ABSTRACT

There is disclosed a hard disk drive and an operation method thereof. A method of operating a hard disk drive according to the present invention may include (a) loading drive data required to drive the hard disk drive from a maintenance cylinder area contained in a disk to a memory; and (b) writing test data output from a head into a spare area contained in the maintenance cylinder area, wherein the steps (a) and (b) are carried out within a ready time.

20 Claims, 5 Drawing Sheets

US 8,804,256 B2

HARD DISK DRIVE, METHOD FOR OPERATING THE SAME, AND COMPUTER SYSTEM HAVING THE SAME

RELATED APPLICATION

Pursuant to 35 U.S.C. §119(a), this application claims the benefit of Korean Application No. 10-2011-0065100, filed on Jun. 30, 2011, the contents of which is incorporated by reference herein in its entirety.

BACKGROUND OF THE INVENTION

1. Field of the Invention

An embodiment according to the concept of the present invention relates to a hard disk drive and an operation method thereof, and more particularly, to a hard disk drive capable of reducing a time required for a head to reach a target flying height, an operation method thereof, and a computer system having the same.

2. Description of the Related Art

Hard disk drive (HDD) is a data storage device for converting digital electronic pulses including data into a permanent magnetic field to record on the disk or reproduce data recorded on the disk. The HDD is used as a representative auxiliary storage device of the computer system due to an advantage of recording and reproducing a large amount of data at high speed.

After power is applied to the HDD, a certain period of time may be required for a head to reach a target flying height. If the head performs a write operation at an unstable flying height, then there may occur a phenomenon in which data is weakly written on the disk.

The HDD performs a write verify operation for a predetermined period of time after power is applied to the HDD to prevent a phenomenon in which data is weakly written on the disk.

SUMMARY OF THE INVENTION

Accordingly, a technical task of the present invention is to provide a hard disk drive capable of reducing a time required for a head to reach a target flying height as well as enhancing the reliability of a write operation, and a device having the same.

A method of operating a hard disk drive according to an embodiment of the present invention may include (a) loading drive data required to drive the hard disk drive from a maintenance cylinder area contained in a disk to a memory; and (b) writing test data output from a head into a spare area contained in the maintenance cylinder area, wherein the steps (a) and (b) are carried out within a ready time.

The method may further include performing a pre-write verify operation using the head subsequent to the step (b); and performing an original-write verify operation using the head subsequent to the pre-write verify operation.

The pre-write verify operation may be carried out within the ready time, and the original-write verify operation may be carried out subsequent to the ready time.

Said performing a pre-write verify operation may include reading the test data written into the spare area and analyzing the read test data to determine whether an error included in the test data is within a preset error allowance range according to the analysis result; and repeating an operation of writing and reading the test data into and from the spare area until the error included in the test data reaches the preset error allowance range according to the determination result.

The pre-write verify operation may be carried out using an error correction code (ECC).

The drive data may include read optimization parameter information, write optimization parameter information, and defect list information.

The ready time may be a time set during a burn-in process.

A hard disk drive according to an embodiment of the present invention may include a disk comprising a maintenance cylinder area having a spare area and a data area; a hard disk controller configured to load drive data required to drive the hard disk drive from the maintenance cylinder area to a memory; and a head configured to write test data into the spare area contained in the maintenance cylinder area, wherein the hard disk controller controls to write the test data output from the head into the spare area during a ready time.

The hard disk controller may perform a pre-write verify operation during the ready time and performs an original-write verify operation subsequent to the ready time.

The maintenance cylinder area may include a main area and the spare area.

According to an embodiment, the spare area may be located outside the main area. The memory may be random access memory (RAM).

The hard disk controller and the memory may be implemented as a system on chip (SoC).

A computer system according to an embodiment of the present invention may include the hard disk drive; and a host configured to control the hard disk drive.

The computer system may be a smart phone, a GPS automotive navigation system or a personal computer (PC).

A hard disk drive according to an embodiment of the present invention provides an effect of reducing a time required for a head to reach a target flying height as well as enhancing the reliability of a write operation of the hard disk drive.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
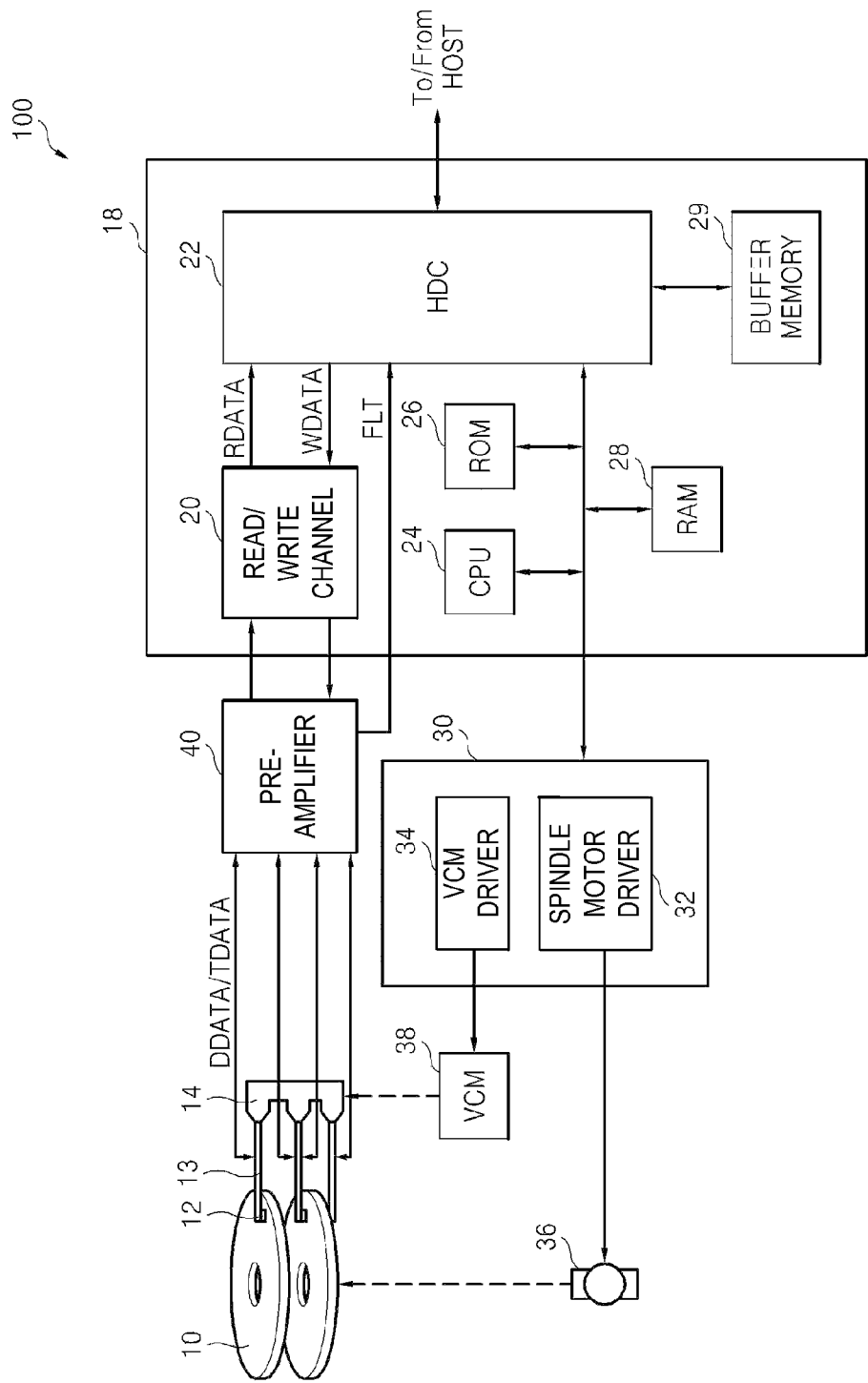
FIG. 1 is a schematic block diagram illustrating a hard disk drive according to an embodiment of the present invention.

For the embodiments according to the concept of the present invention disclosed herein, specific structural or functional descriptions are exemplary to merely describe the embodiments of the present invention, and the embodiments of the present invention can be implemented in various forms and should not be interpreted as being limited to the embodiments described in the present specification.

As various modifications can be made and diverse embodiments are applicable to the embodiments according to the concept of the present invention, specific embodiments will be illustrated with reference to the accompanying drawings and described in detail herein. However, those specific embodiments should not be construed to limit the embodiments according to the concept of the present invention, and should be construed as being extended to all modifications, equivalents, and substitutes included in the concept and technological scope of the invention.

The terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

In case where an element is "connected" or "linked" to the other element, it should be understood that the element may be directly connected or linked to the other element, but another element may be existed therebetween. On the contrary, in case where an element is "directly connected" or "directly linked" to another element, it should be understood that any other element is not existed therebetween. Other expressions describing a relation between constituent elements, such as "between ~" and "immediately between ~", or "adjacent to ~" and "directly adjacent to ~", and the like, should be construed in a similar manner.

It should be noted that the terms used herein are merely used to describe a specific embodiment, but not to limit the present invention. Incidentally, unless clearly used otherwise, expressions in the singular number include a plural meaning. In this application, the term "comprising," "including," or the like, intend to express the existence of the characteristic, the numeral, the step, the operation, the element, the part, or the combination thereof, and do not intend to exclude another characteristic, numeral, step, operation, element, part, or any combination thereof, or any addition thereto.

Unless defined otherwise, the terms used herein including technological or scientific terms have the same meaning that is generally understood by those ordinarily skilled in the art to which the invention pertains. The terms used herein shall not be interpreted not only based on the definition of any dictionary but also the meaning that is used in the field to which the invention pertains. Also, unless clearly defined, the terms used herein shall not be interpreted too ideally or formally.

Hereinafter, the present invention will be described in detail with reference to the accompanying drawing by describing a preferred embodiment of the present invention.

Figure 2:
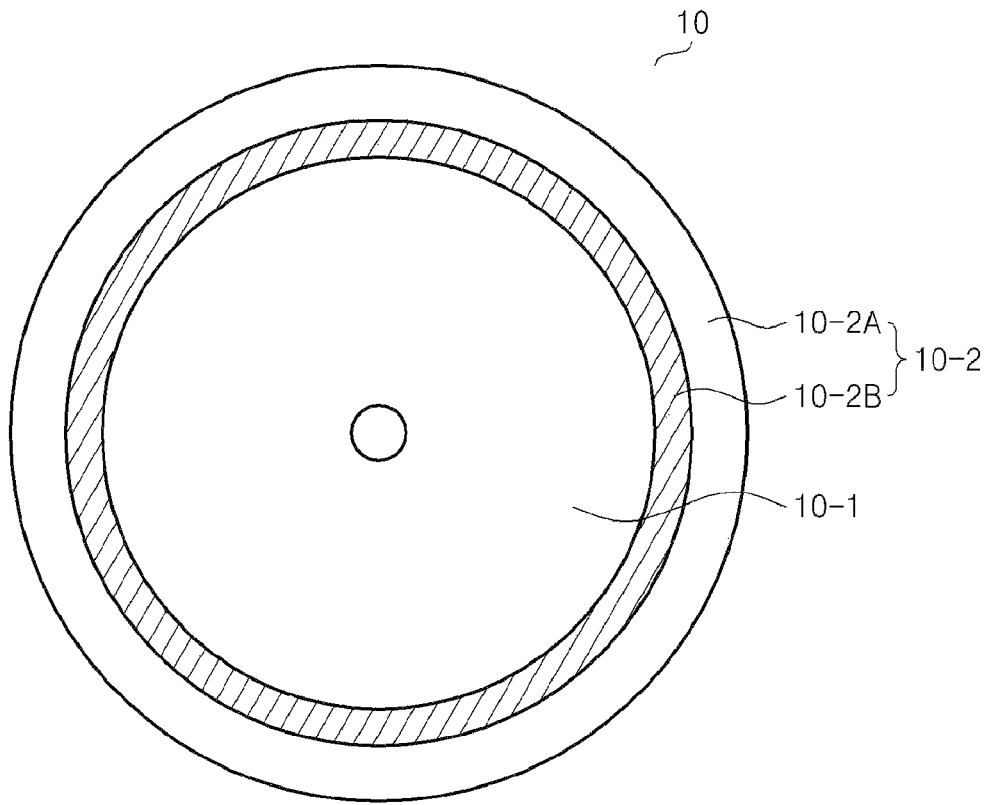
FIG. 2 is a view for explaining a plurality of disks, respectively, illustrated in FIG. 1.

FIG. 1 is a schematic block diagram illustrating a hard disk drive according to an embodiment of the present invention, and FIG. 2 is a view for explaining a plurality of disks, respectively, illustrated in FIG. 1.

Referring to FIG. 1, the hard disk drive 100 may include a plurality of disks 10, a plurality of heads 12, a head assembly 14, a pre-amplifier 40, a circuit block 18, a motor control block (or servo control block 30), a spindle motor 36, and a voice coil motor (VCM) 38.

Referring to FIG. 2, each of the plurality of disks 10 may include a data area 10-1 and a maintenance cylinder area 10-2.

The maintenance cylinder area 10-2 may include drive data (DDATA) including read optimization parameter information, write optimization parameter information, and defect list information.

The maintenance cylinder area 10-2 is located outside the data area 10-1, and may include a main area 10-2A in which drive data (DDATA) is stored and a spare area 10-2B.

The spare area 10-2B is located between the main area 10-2A and data area 10-1.

According to an embodiment, the implemented location of the spare area 10-2B and data area 10-1 may be changed with each other.

Each of the plurality of disks 10 may store data, and may be rotated by the spindle motor 36. Each of the plurality of heads 12 is located over the corresponding one of the plurality of disks 10 to perform a read operation or write operation, and provided at each of the support arms 13 extended toward the plurality of disks 10 from the head assembly 14 combined with the voice coil motor 38.

When reading data stored in any one of the plurality of disks 10, the pre-amplifier 40 amplifies a read signal output from a read head implemented on any one of the plurality of heads 12, and outputs the amplified read signal to a read/write channel circuit 20.

When writing data into any one of the plurality of disks 10, the pre-amplifier 40 transmits a write signal, for instance, a write current output from the read/write channel circuit 20, to any one of the plurality of heads 12. Accordingly, the write head implemented on the any one head can write the write signal into any one of the plurality of disks 10.

The read/write channel circuit 20 converts a read signal amplified by the pre-amplifier 40 into read data (RDATA), and outputs the read data (RDATA) to the hard disk controller (HDC) 22. Furthermore, the read/write channel circuit 20 converts write data (WDATA) output from the hard disk controller 22 into a write signal, and outputs the write signal to the pre-amplifier 40.

When writing data into any one of the plurality of disks 10, the hard disk controller 22 outputs write data output from the host under the control of the CPU 24 to the read/write channel circuit 20. Accordingly, the write data output from the host may be written into any one of the plurality of disks 10 through the read/write channel circuit 20, the pre-amplifier 40, and the corresponding head.

When reading data from the plurality of disks 10, the hard disk controller 22 may receive read data (RDATA) decoded by the read/write channel circuit 20 under the control of the CPU 24, and transmit the received read data to the host through an interface.

The central processing unit (CPU) 24 may read a control code or boot code stored in the read only memory (ROM) 26 to store it in the random access memory (RAM) 28, and control the operation of the hard disk drive 100 or hard disk controller 22 as a whole based on the control code or boot code stored in the RAM 28.

The CPU 24 may receive a read command or write command output from the host through each interface connected to the bus, and control the operation of a servo controller capable of controlling the spindle motor driving unit 32 and VCM driving unit 34 to control track seek or track following according to the received command.

The spindle motor driving unit 32 controls the operation of the spindle motor 36 for controlling the rotation of the plurality of disks 10 in response to a control signal output from the hard disk controller 22.

The VCM driving unit 34 generates a drive current for driving the voice coil motor 38 in response to a control signal for controlling the location of the plurality of heads 12, respectively, which is output from the hard disk controller 22, to output it to a voice coil of the voice coil motor 38.

Accordingly, the voice coil motor 38 moves the plurality of heads 12 over a track implemented on any one of the plurality of disks 10 on which data desired to be read is recorded among the plurality of disks 10 according to the direction and level of the drive current being output from the VCM driving unit 34. The head 12 moved by the voice coil motor 38 outputs location information recorded on any one of the plurality of disks 10 to the pre-amplifier 40 under the control of a control signal output from the read/write channel circuit 20 or the hard disk controller 22.

If the head 12 is moved to a target track of any one of the plurality of disks 10, then a disk formatter (not shown) of the hard disk controller 22 outputs a servo gate signal to the read/write channel circuit 20.

The read/write channel circuit 20 reads a servo pattern recorded on the plurality of disks 10 in response to the servo gate signal.

The buffer memory 29 may temporarily store data being transmitted and received between the hard disk drive 100 and the host. According to another embodiment, the buffer memory 29 may be implemented outside the circuit block 18.

According to an embodiment, the circuit block 18 including the read/write channel circuit 20, hard disk controller 22, CPU 24, ROM 26, RAM 28 may be implemented as a system on chip (SoC), for instance. Furthermore, the motor control block 30 including the spindle motor driving unit 32 and VCM driving unit 34 may be implemented as a system on chip (SoC), for instance.

Figure 3:
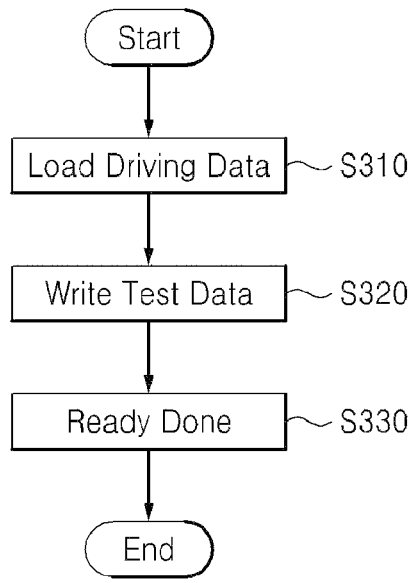
FIG. 3 is a flow chart for explaining a method of operating a hard disk drive illustrated in FIG. 1.
Figure 4:
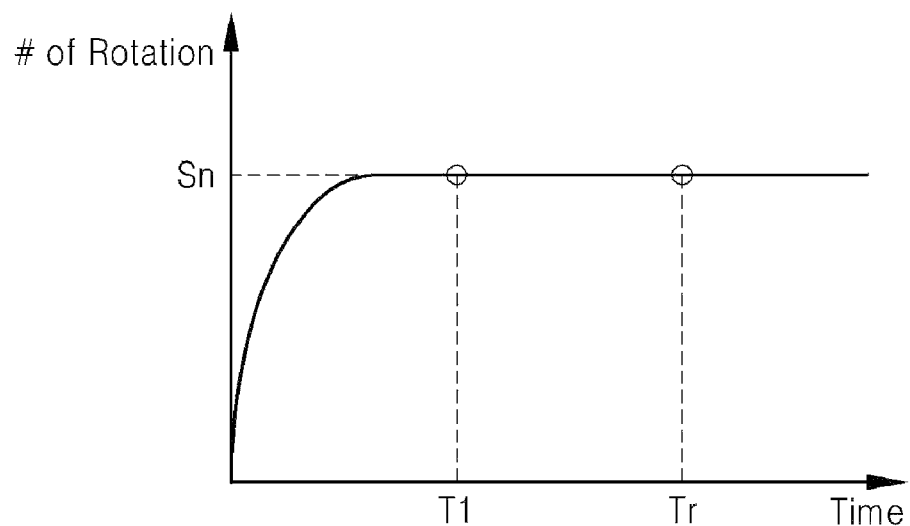
FIG. 4 is a graph illustrating the number of rotations of a spindle motor as time passes.
Figure 5:
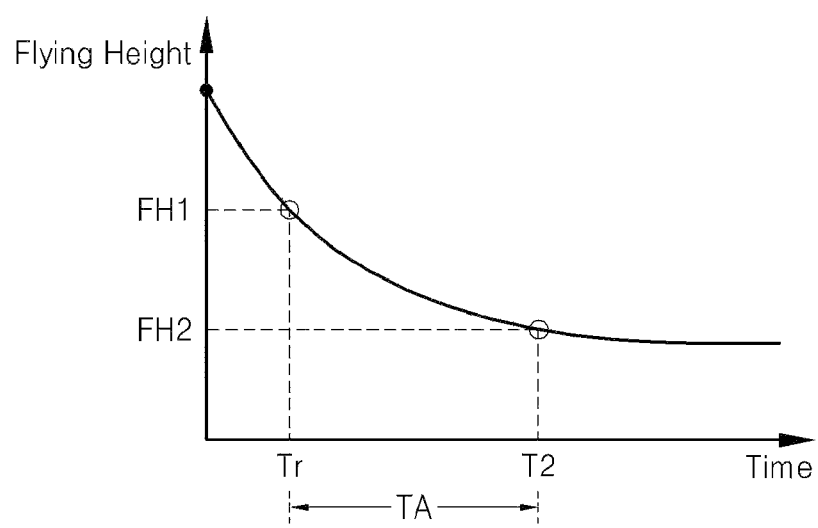
FIG. 5 is a graph illustrating a flying height of the head as time passes.

FIG. 3 is a flow chart for explaining a method of operating a hard disk drive illustrated in FIG. 1, and FIG. 4 is a graph illustrating the number of rotations of a spindle motor as time passes, and FIG. 5 is a graph illustrating a flying height of the head as time passes.

Referring to FIGS. 1 through 5, when power is applied to the hard disk drive 100, the central processing unit (CPU) 24 loads drive data (DDATA) required to drive the hard disk drive 100 from the maintenance cylinder area 10-2 contained in the disk 10 to the memory 28 (S310).

The hard disk controller 22 writes test data (TDATA) output from the head 12 into the spare area 10-2B contained in the maintenance cylinder area 10-2 (S320).

The loading and writing operations are carried out within a ready time (S330). Here, the ready time refers to a time (Tr) required until power is applied to the hard disk to drive 100, and then drive data (DDATA) required for driving is loaded to the RAM 28, and preparation for receiving a command from the host is completed. The ready time may be a time set in a burn-in process.

Referring to FIG. 4, the write operation is carried out between a time (T1) at which the number of rotations of the spindle motor 36 reaches the number of normal rotations (Sn) and the ready time (Tr).

Referring to FIG. 5, the hard disk drive 100 controls the head 12 to perform a write operation on the spare area 10-2B during the ready time, thereby warming up the head 12. Accordingly, the hard disk drive 100 can reduce a time (T2), which is required for the head 12 to arrive at a target flying height (FH2) from a flying height (FH1) at the time point of the ready time (Tr).

Figure 6:
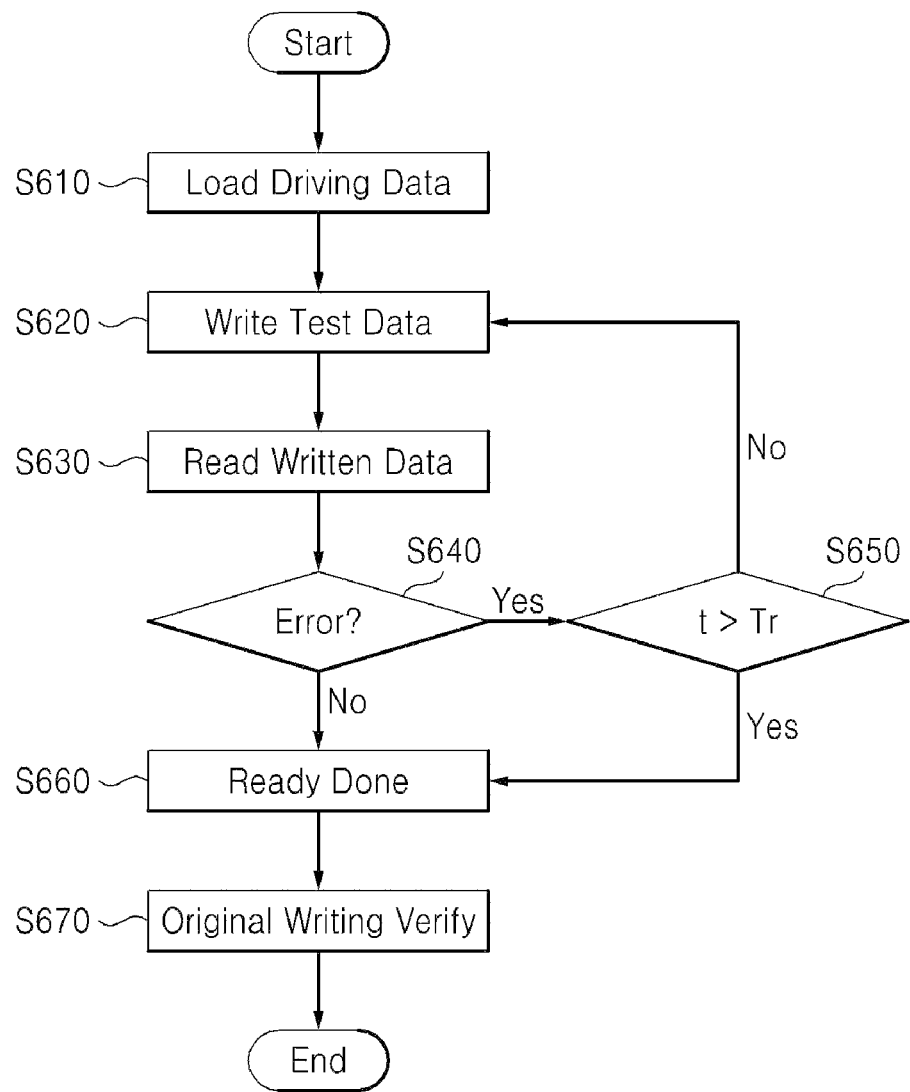
FIG. 6 is a flow chart for explaining another example of the method of operating a hard disk drive illustrated in FIG. 1.

FIG. 6 is a flow chart for explaining another example of the method of operating a hard disk drive illustrated in FIG. 1.

Referring to FIGS. 1, 2, 4, 5, and 6, when power is applied to the hard disk drive 100, the CPU 24 loads drive data (DDATA) required to drive the hard disk drive 100 from the maintenance cylinder area 10-2 contained in the disk 10 to the memory 28, for instance, RAM 28 (S610).

Subsequent to the loading operation, the hard disk controller 22 writes test data (TDATA) output from the head 12 into the spare area 10-2B contained in the maintenance cylinder area 10-2 (S620).

The hard disk controller 22 performs a pre-write verify operation using the head 12 (S630-S660), and performs an original-write verify operation subsequent to the pre-write verify operation (S670).

Describing the process of performing the pre-write verify operation in detail, the hard disk controller 22 performs a write operation for test data (TDATA), and then reads the written test data (TDATA) (S630).

The hard disk controller 22 analyzes the read test data (TDATA) to determine whether an error included in the test data (TDATA) is within a preset error allowance range according to the analysis result (S640).

As a result of the determination, if the error is out of the preset error allowance range and the determination time (t) is prior to the ready time (Tr) (S650), then the test data (TDATA) is written to the spare area 10-2B (S620).

On the contrary, as a result of the determination, if 1) the error is out of the preset error allowance range and the determination time (t) is subsequent to the ready time (Tr) (S650) or 2) the error is within the preset error allowance range, then the pre-write verify operation is completed (S660).

According to an embodiment, the pre-write verify operation may be carried out using an error correction code (ECC).

The hard disk controller 22 performs an original-write verify operation after the ready time has passed (S670).

On the other hand, the original-write verify operation refers to an operation that write data and data corresponding to the write data, which is read from the disk 10, are compared with each other to determine whether the write data has been properly written on the disk 10.

The pre-write verify operation may be carried out within the ready time (Tr), and the original-write verify operation may be carried out subsequent to the ready time (Tr).

Figure 7:
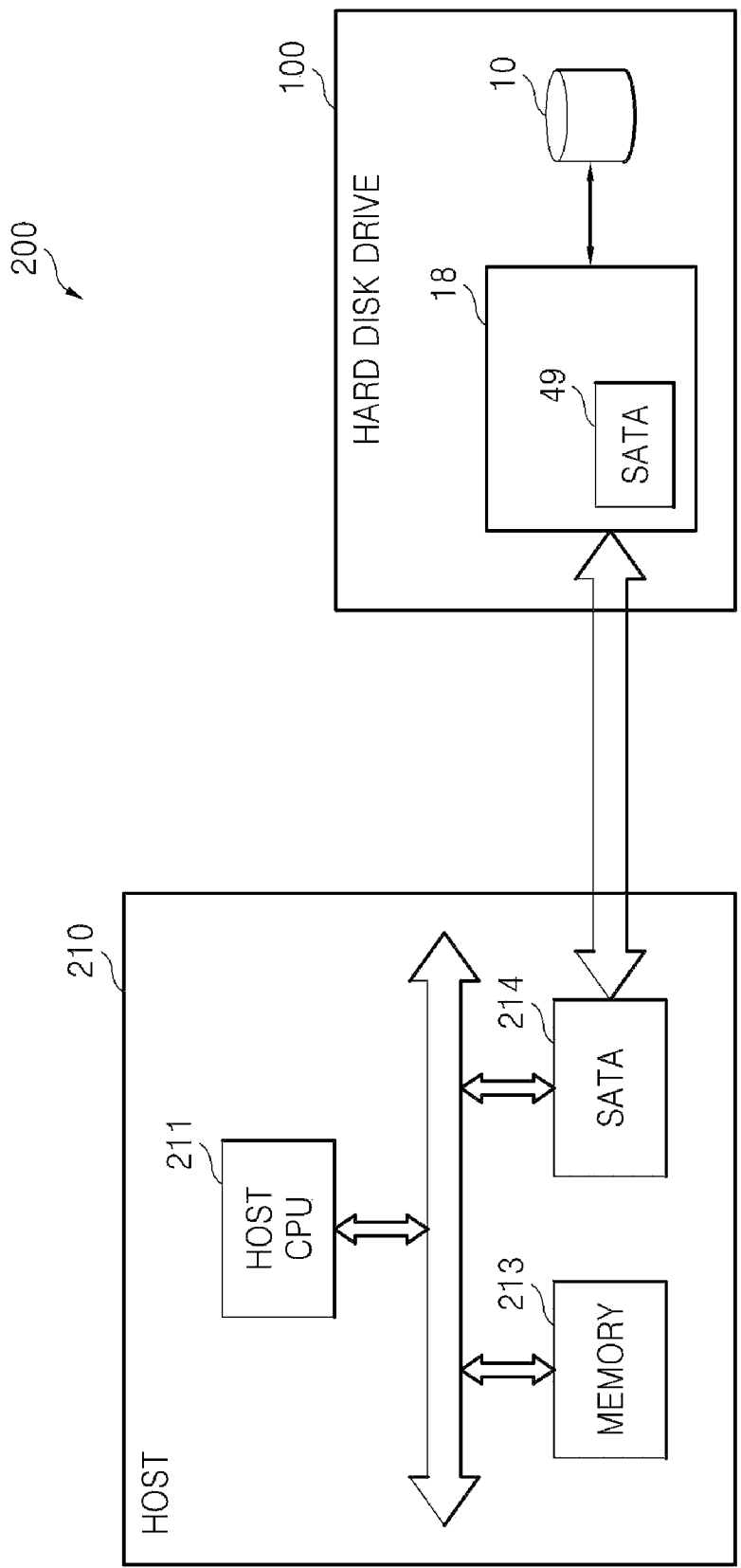
FIG. 7 is a schematic block diagram illustrating a computer system including a hard disk drive illustrated in FIG. 1.

FIG. 7 is a schematic block diagram illustrating a computer system including a hard disk drive illustrated in FIG. 1.

Referring to FIG. 7, the computer system 200 may be a personal computer (PC), a portable computer, a mobile phone, a smart phone, a tablet PC, a personal digital assistant (PDA), a portable multimedia player (PMP), a GPS automotive navigation system, an MP3 player, audio equipment, a television (TV), a digital camera, or a camcorder.

The computer system 200 may include the hard disk drive 100, and a host 210 for transmitting and receiving data to and from the hard disk drive 100.

The host 210 may include a host CPU 211, a memory 213, and an interface 214. The host CPU 211 may control the operation of the host 210 to transmit data output from the memory 213 to a host interface 49 implemented on the circuit block 18 of the hard disk drive 100 through the interface 214 during the write operation.

The interface 214 and host interface 49 may be implemented with a SATA interface. Accordingly, the interface 214 and host interface 49 can transmit or receive data using a SATA protocol.

During the read operation, the interface 214 may store data transmitted from the host interface 49 implemented on the circuit block 18 of the hard disk drive 100 under the control of the host CPU 211.

The host CPU 211 may process data stored in the memory 213, for instance, display data using a display device or output data using a peripheral device, for instance, a printer connected to a USB port.

Although the present invention has been described with reference to an embodiment as illustrated in the drawings, the foregoing embodiment is merely illustrative, and it should be understood by those skilled in the art that various modifications and equivalent other embodiments of the present invention can be made. Consequently, the true technical protective scope of the present invention should be determined based on the technical concept of the appended claims.

What is claimed is:

1. A method, comprising:
   (a) loading drive data used for driving a hard disk drive from a maintenance cylinder area of a disk to a memory; and
   (b) writing test data output from a head into a spare area of the maintenance cylinder area, wherein the steps (a) and (b) are carried out within a ready time defined between application of power to the drive and the head reaching a target flying height.

2. The method of claim 1, further comprising:
   performing a pre-write verify operation using the head subsequent to the step (b); and
   performing an original-write verify operation using the head subsequent to the pre-write verify operation.

3. The method of claim 2, wherein the pre-write verify operation is carried out within the ready time, and the original-write verify operation is carried out subsequent to the ready time.

4. The method of claim 2, wherein said performing a pre-write verify operation comprises:
   reading the test data written into the spare area and analyzing the read test data to determine whether an error included in the test data is within a preset error allowance range according to an analysis result; and
   repeating an operation of writing and reading the test data into and from the spare area until the error included in the test data reaches the preset error allowance range according to a determination result.

5. The method of claim 2, wherein the pre-write verify operation is carried out using an error correction code.

6. The method of claim 1, wherein the drive data comprises read optimization parameter information, write optimization parameter information, and defect list information.

7. The method of claim 1, wherein the ready time is a time set during a burn-in process.

8. The method of claim 1, wherein the loading step and the writing step are carried out before a spindle motor of the drive reaches a predetermined number of normal rotations.

9. The method of claim 1, wherein the loading step and the writing step are carried out during a duration of time for warming up the head.

10. The method of claim 1, wherein the loading step and the writing step are carried out during a duration of time required to complete preparation for receiving a command from a host.

11. An apparatus, comprising:
    a disk comprising a maintenance cylinder area having a spare area and a data area;
    a hard disk controller configured to load drive data used for driving a hard disk drive from the maintenance cylinder area to a memory; and
    a head configured to write test data into the spare area contained in the maintenance cylinder area,
    wherein the hard disk controller is configured to write the test data output from the head into the spare area during a ready time defined between application of power to the apparatus and the head reaching a target flying height.

12. The apparatus of claim 11, wherein the hard disk controller is configured to performs a pre-write verify operation during the ready time and performs an original-write verify operation subsequent to the ready time.

13. The apparatus of claim 11, wherein the maintenance cylinder area comprises a main area and the spare area.

14. The apparatus of claim 13, wherein the spare area is located outside the main area.

15. The apparatus of claim 11, wherein the memory is random access memory.

16. The apparatus of claim 11, wherein the hard disk controller and the memory are implemented as a system on chip.

17. The apparatus of claim 11, wherein loading and writing are carried out during a duration of time between application of power to the drive and a spindle motor of the drive reaching a predetermined number of normal rotations.

18. The apparatus of claim 11, wherein loading and writing are carried out during a duration of time required to complete preparation for receiving a command from a host.

19. A system, comprising:
    a hard disk drive configured to perform the steps of:
       (a) loading drive data used for driving the hard disk drive from a maintenance cylinder area of a disk to a memory; and
       (b) writing test data output from a head into a spare area of the maintenance cylinder area, wherein the loading step and the writing step are carried out in full before the head reaches a target flying height; and
    a host configured to control the hard disk drive.

20. The system of claim 19, wherein the system is a smart phone, a GPS automotive navigation system or a personal computer.

* * * * *

UNITED STATES PATENT AND TRADEMARK OFFICE
CERTIFICATE OF CORRECTION

PATENT NO. : 8,804,256 B2  
APPLICATION NO. : 13/538721  
DATED : August 12, 2014  
INVENTOR(S) : Jae Ki Hong et al.

It is certified that error appears in the above-identified patent and that said Letters Patent is hereby corrected as shown below:

In the Claims

Column 8, lines 17-18, Claim 12: "is configured to performs a pre-write verify operation during the ready time and performs an original-write verify" should read --is configured to perform a pre-write verify operation during the ready time and perform an original-write verify--.

Signed and Sealed this  
Third Day of February, 2015

Michelle K. Lee  
*Deputy Director of the United States Patent and Trademark Office*